(12) United States Patent
MacFarlane et al.

(10) Patent No.: US 6,516,348 B1
(45) Date of Patent: Feb. 4, 2003

(54) COLLECTING AND PREDICTING CAPACITY INFORMATION FOR COMPOSITE NETWORK RESOURCE FORMED BY COMBINING PORTS OF AN ACCESS SERVER AND/OR LINKS OF WIDE AREAR NETWORK

(76) Inventors: Druce Ian Craig Rattray MacFarlane, 940 Buckeye Dr., Sunnyvale, CA (US) 94086; John Harvey Hardin, 444 Cliff Dr., Aptos, CA (US) 95003; David Donoho, 2830 Buena Vista Way, Berkeley, CA (US) 94708-2106

(*) Notice: Subject to any disclaimer, the term of this patent is extended or adjusted under 35 U.S.C. 154(b) by 0 days.

(21) Appl. No.: 09/316,251

(22) Filed: May 21, 1999

(51) Int. Cl.[7] .............................................. G06F 15/173
(52) U.S. Cl. ....................... 709/224; 709/226; 709/229; 702/130; 702/141; 370/232
(58) Field of Search ................................ 709/226, 229, 709/224; 702/130, 141; 370/232

(56) References Cited

U.S. PATENT DOCUMENTS

| | | | | |
|---|---|---|---|---|
| 4,417,306 A | * | 11/1983 | Citron et al. | 600/521 |
| 4,716,903 A | * | 1/1988 | Hansen et al. | 607/9 |
| 4,745,564 A | * | 5/1988 | Tennes et al. | 702/141 |
| 4,817,080 A | | 3/1989 | Soha | 370/252 |
| 4,959,854 A | | 9/1990 | Cave et al. | 379/157 |
| 5,101,402 A | | 3/1992 | Chiu et al. | 709/224 |
| 5,111,531 A | | 5/1992 | Grayson et al. | 706/23 |
| 5,247,517 A | | 9/1993 | Ross et al. | 370/452 |
| 5,251,152 A | | 10/1993 | Notess | 709/224 |
| 5,315,580 A | | 5/1994 | Phaal | 370/252 |
| 5,339,389 A | | 8/1994 | Bates et al. | 345/742 |
| 5,353,398 A | | 10/1994 | Kitahara et al. | 345/759 |
| 5,506,955 A | | 4/1996 | Chen et al. | 714/26 |
| 5,615,323 A | | 3/1997 | Engel et al. | 345/440 |
| 5,867,495 A | | 2/1999 | Elliott et al. | 370/352 |
| 5,872,911 A | * | 2/1999 | Berg | 714/43 |
| 5,884,037 A | * | 3/1999 | Aras et al. | 709/226 |
| 5,926,777 A | * | 7/1999 | Vink et al. | 702/130 |
| 5,951,644 A | * | 9/1999 | Creemer | 709/229 |
| 5,970,064 A | * | 10/1999 | Clark et al. | 370/351 |
| 6,122,959 A | * | 9/2000 | Hoshal et al. | 73/489 |
| 6,272,110 B1 | * | 8/2001 | Tunnicliffe et al. | 370/232 |

FOREIGN PATENT DOCUMENTS

| | | |
|---|---|---|
| CA | 2099414 | 4/1997 |
| WO | WO 94/14118 | 6/1994 |

* cited by examiner

*Primary Examiner*—Nabil Elhady
(74) *Attorney, Agent, or Firm*—Cooley Godward LLP

(57) ABSTRACT

A method of displaying capacity information relating to computer resources over a preselected period of time. The computer resource is connected to a communications network and the method includes collecting data relating to capacity of the resource by periodically sampling preselected resource elements at a preselected fixed interval to define a capacity variable for that resource. The periodic sampling takes place from a location on the network that is remote from the computer resource and over a period of time for the resource element. The capacity variable of the resource element is compared with capacity variable(s) collected immediately prior to said capacity variable. The capacity variable is stored, together with an associated timestamp, if said capacity variable falls outside a preselected margin of the average of the prior capacity variables. For each resource, the combined preselected capacity values of each preselected resource element are displayed in graphical and tabular form in reference to the total capacity of the preselected resource.

6 Claims, 15 Drawing Sheets

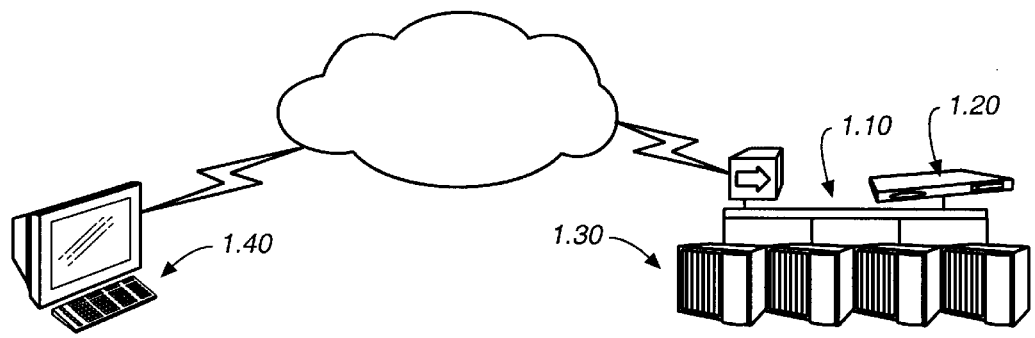
FIG._1
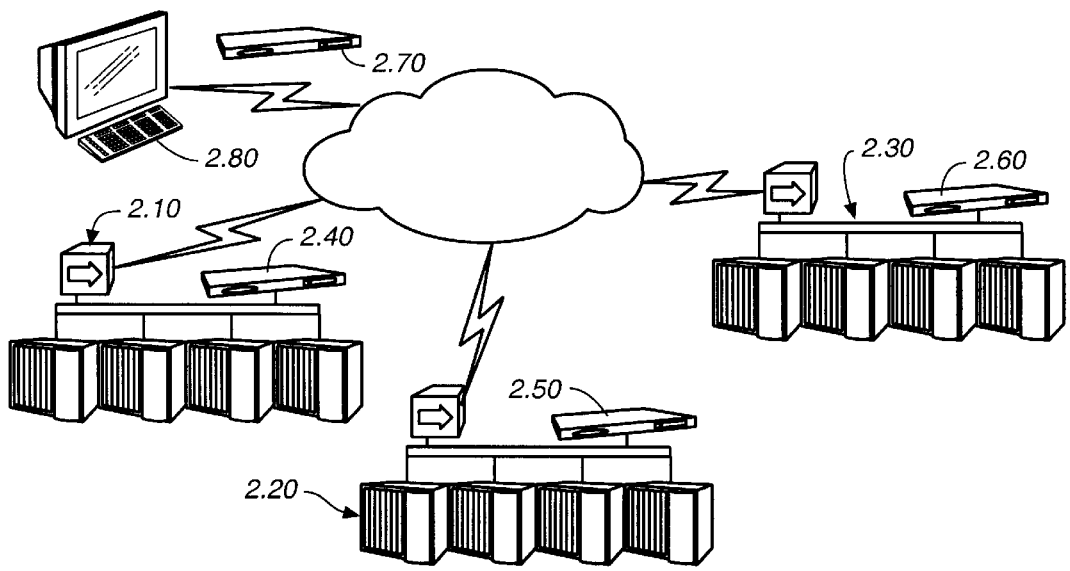
FIG._2

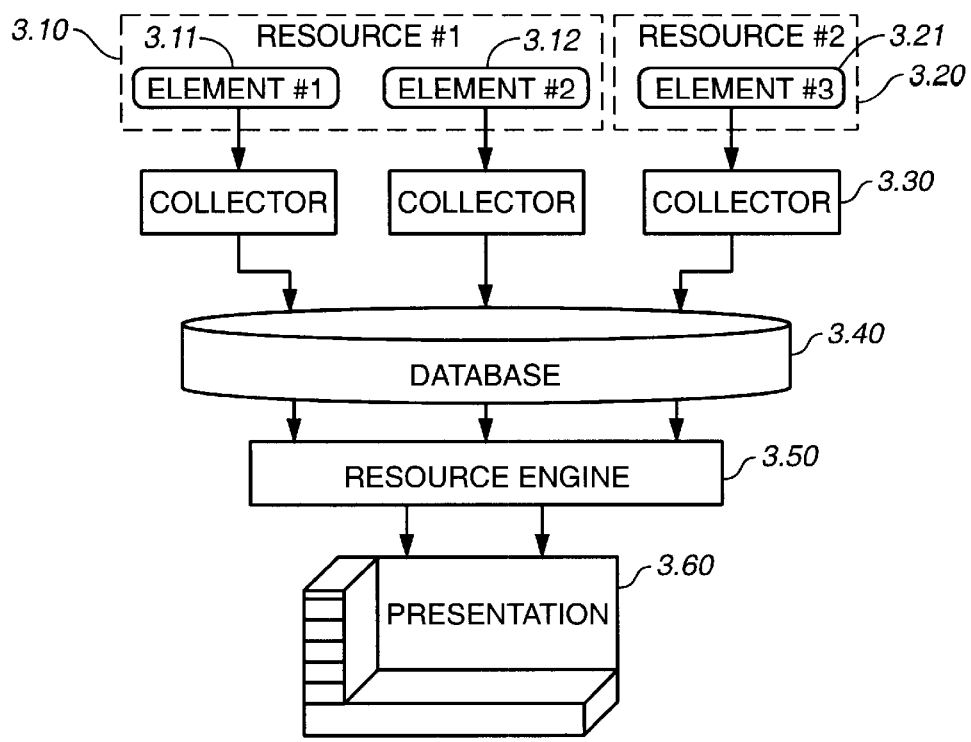
FIG._3
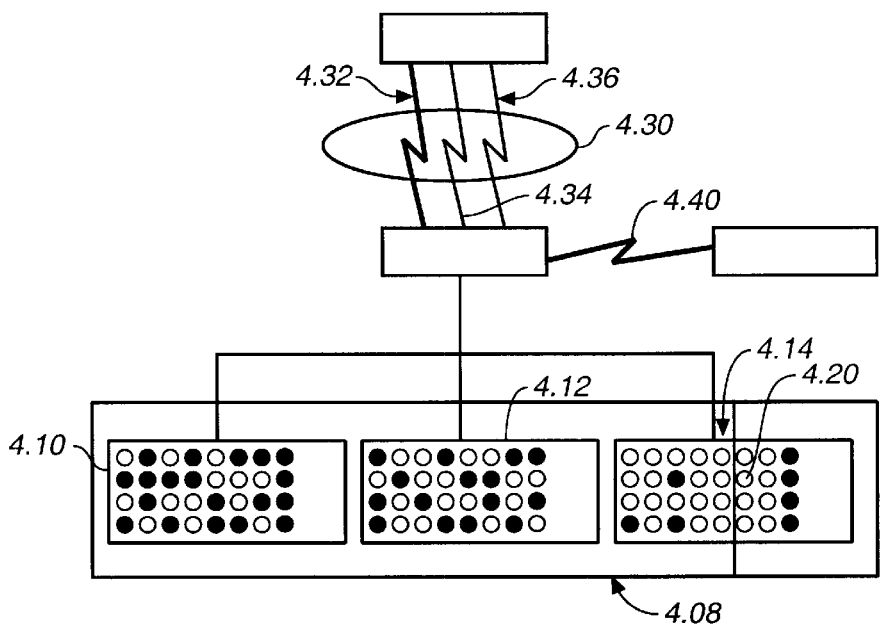
FIG._4

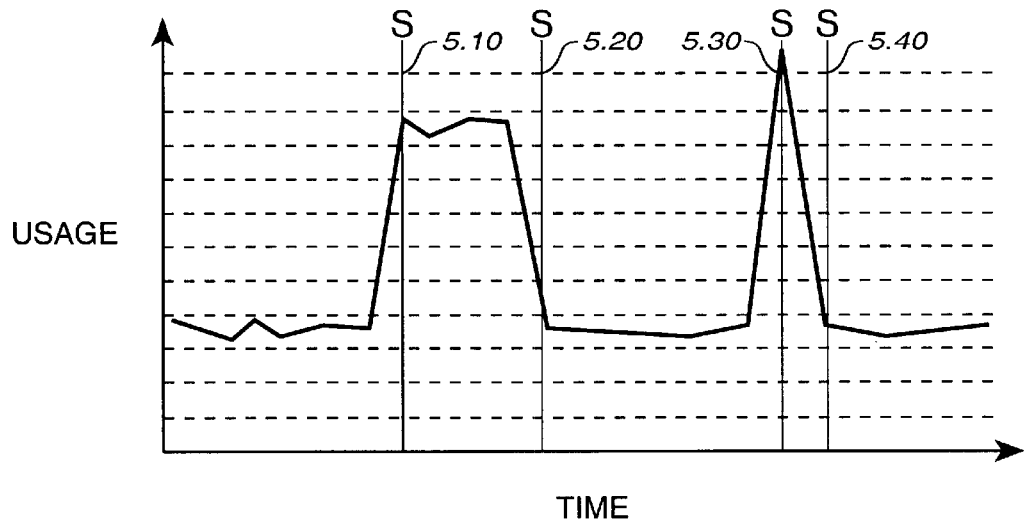
FIG._5
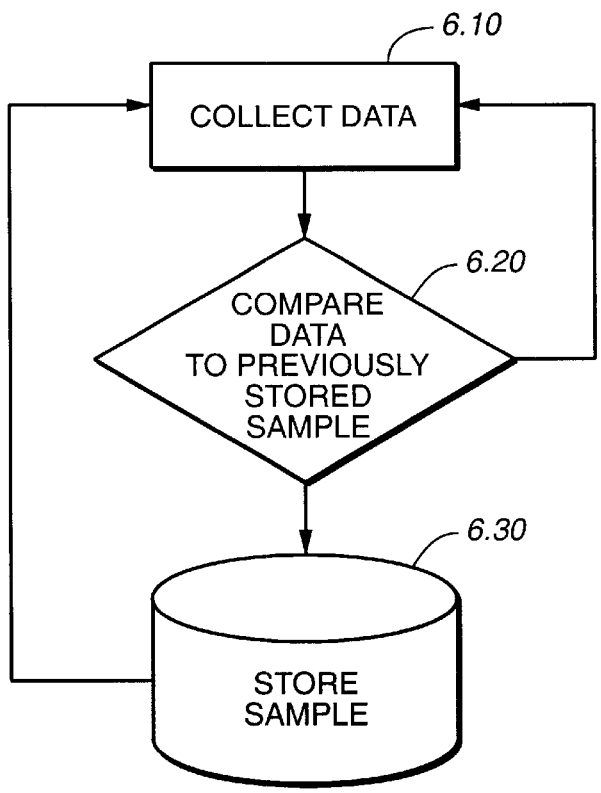
FIG._6

| | |
|---|---|
| Sat Sep 26 00:00:00 1998 | 21 |
| Sat Sep 26 00:03:36 1998 | 16 |
| Sat Sep 26 00:07:12 1998 | 9 |
| Sat Sep 26 00:10:48 1998 | 11 |
| Sat Sep 26 00:14:24 1998 | 13 |
| Sat Sep 26 00:18:00 1998 | 12 |
| Sat Sep 26 00:39:36 1998 | 16 |
| Sat Sep 26 00:43:12 1998 | 19 |
| Sat Sep 26 01:12:00 1998 | 16 |
| Sat Sep 26 01:15:36 1998 | 13 |
| Sat Sep 26 01:19:12 1998 | 10 |
| Sat Sep 26 01:22:48 1998 | 7 |
| Sat Sep 26 01:26:24 1998 | 8 |
| Sat Sep 26 01:30:00 1998 | 13 |
| Sat Sep 26 02:06:00 1998 | 12 |
| Sat Sep 26 02:09:36 1998 | 7 |
| Sat Sep 26 02:24:00 1998 | 1 |
| Sat Sep 26 02:27:36 1998 | 5 |
| Sat Sep 26 02:31:12 1998 | 8 |
| Sat Sep 26 02:34:48 1998 | 8 |
| Sat Sep 26 02:38:24 1998 | 9 |
| Sat Sep 26 02:42:00 1998 | 14 |
| Sat Sep 26 02:45:36 1998 | 9 |
| Sat Sep 26 02:49:12 1998 | 8 |
| Sat Sep 26 02:52:48 1998 | 8 |
| Sat Sep 26 02:56:24 1998 | 7 |
| Sat Sep 26 03:00:00 1998 | 6 |
| Sat Sep 26 03:03:36 1998 | 7 |
| Sat Sep 26 03:07:12 1998 | 3 |
| Sat Sep 26 03:10:48 1998 | 9 |
| Sat Sep 26 03:14:24 1998 | 11 |
| Sat Sep 26 03:36:00 1998 | 5 |
| Sat Sep 26 03:39:36 1998 | 8 |
| Sat Sep 26 03:43:12 1998 | 11 |
| Sat Sep 26 03:54:00 1998 | 4 |
| Sat Sep 26 03:57:36 1998 | 5 |

*FIG._7*

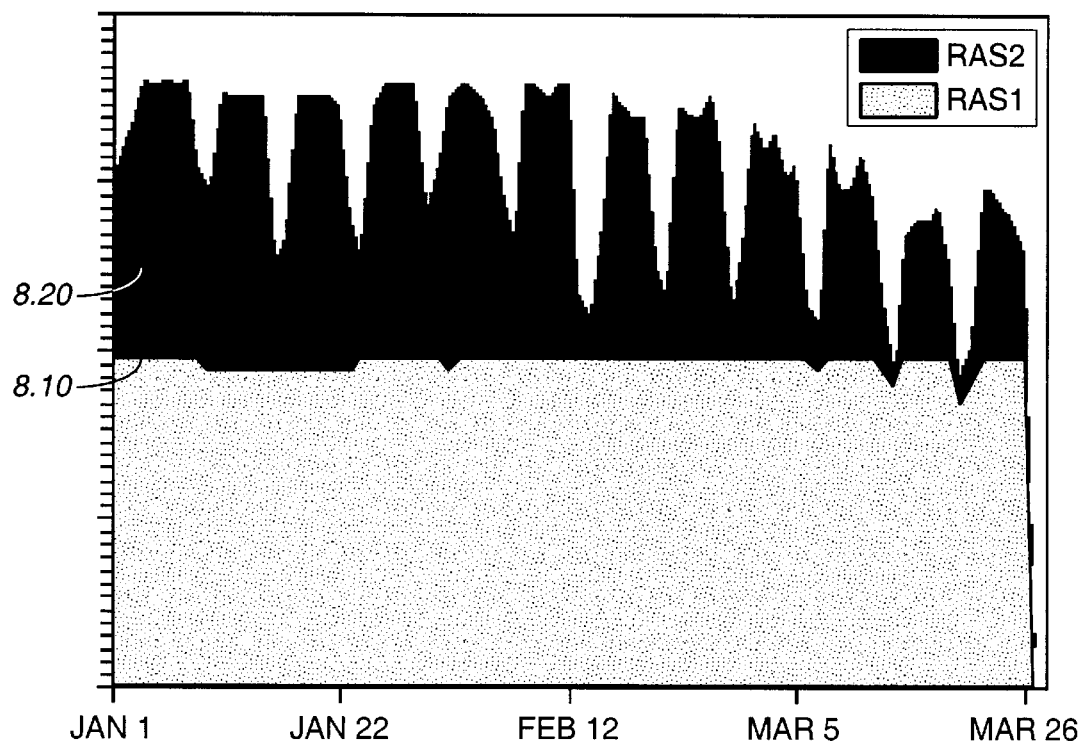
FIG._8
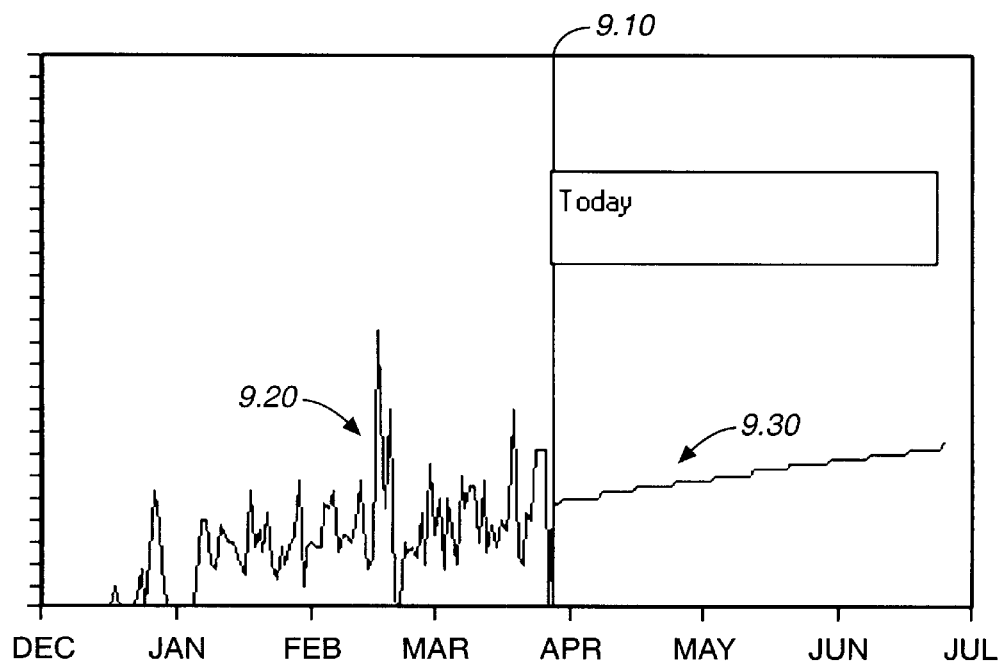
FIG._9

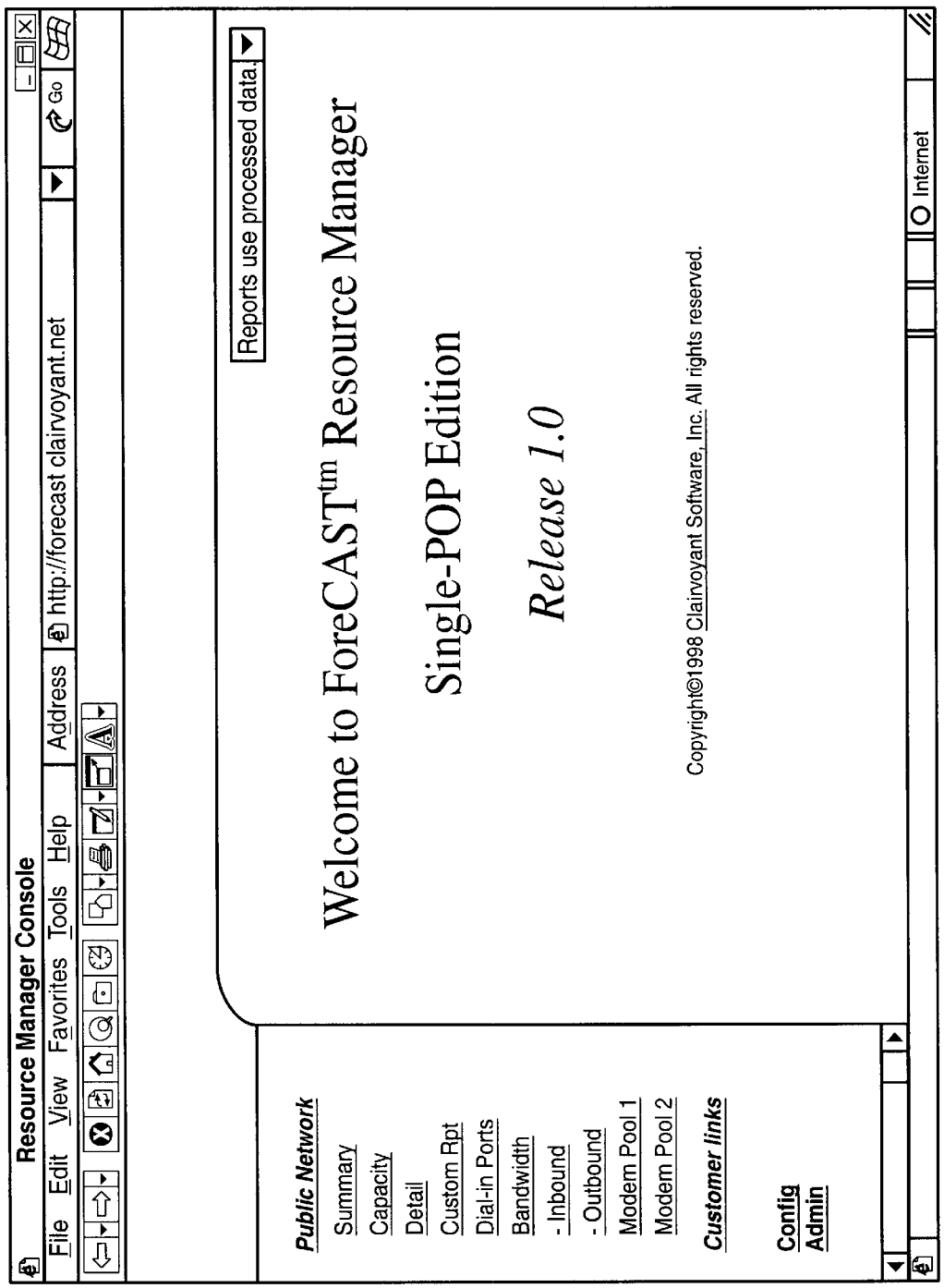
FIG._10

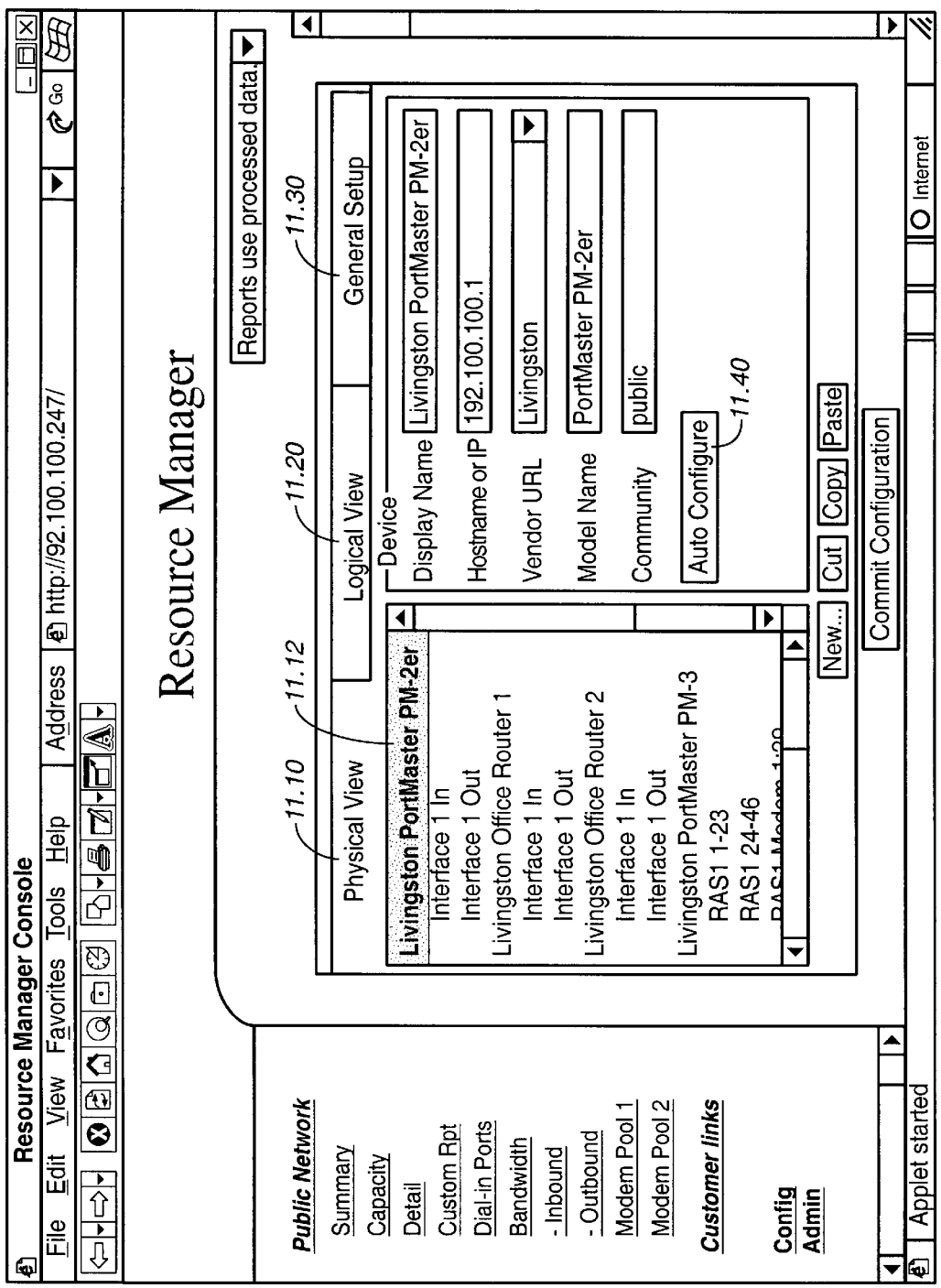
FIG._11

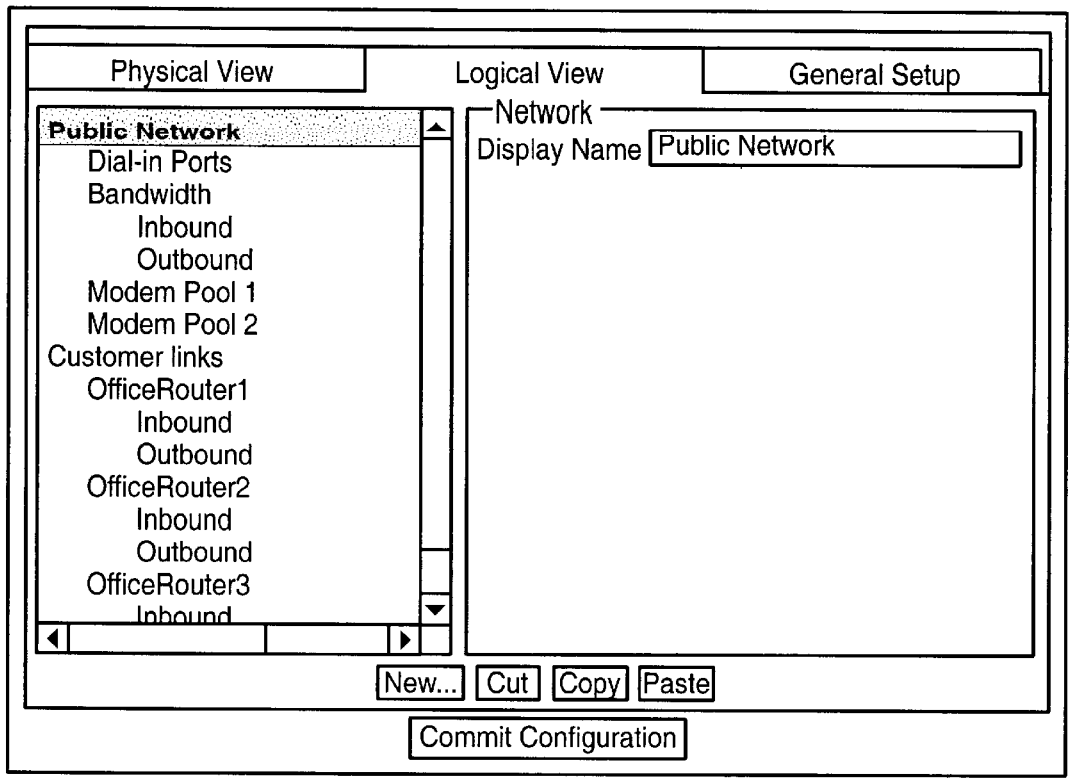
FIG._12
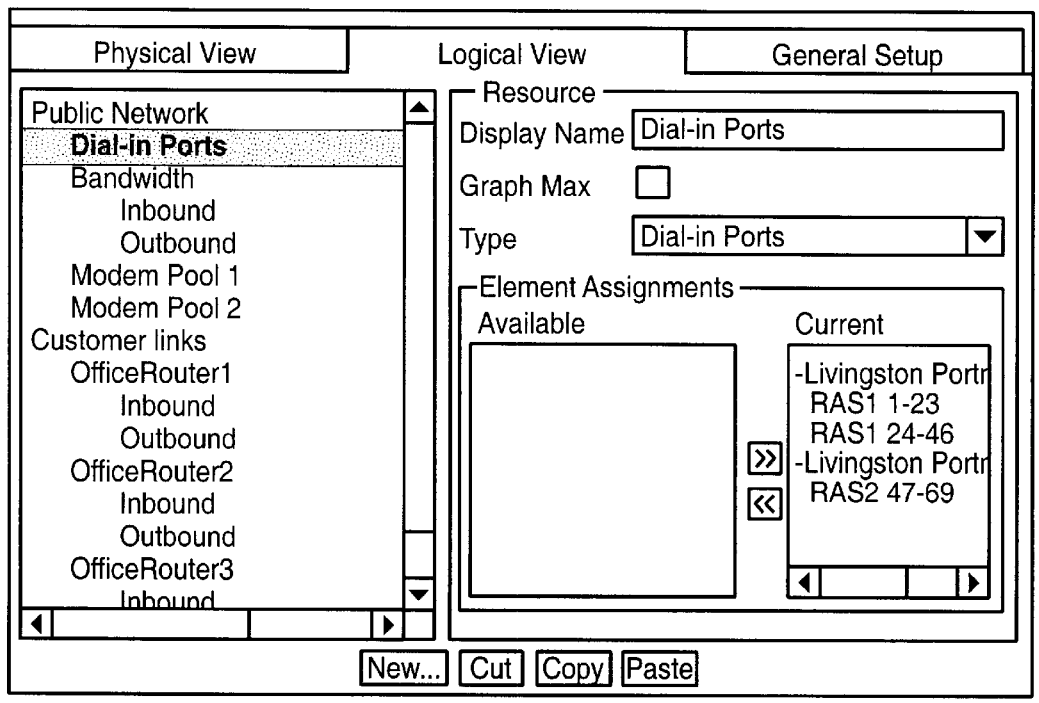
FIG._13

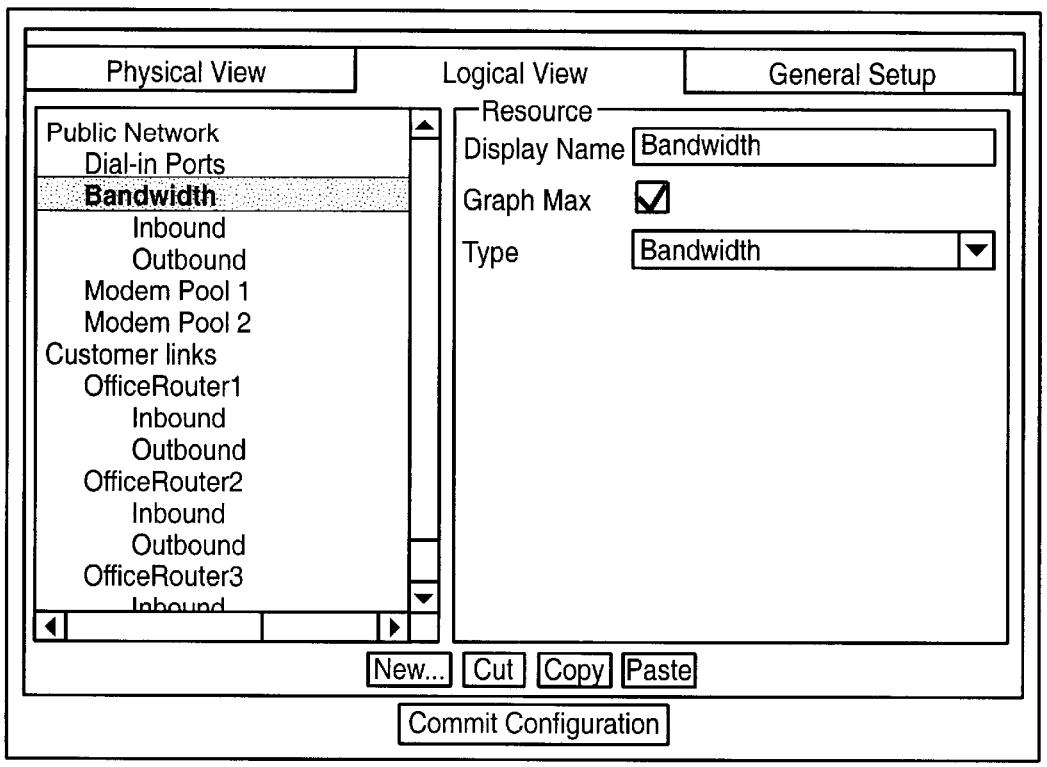
FIG._14
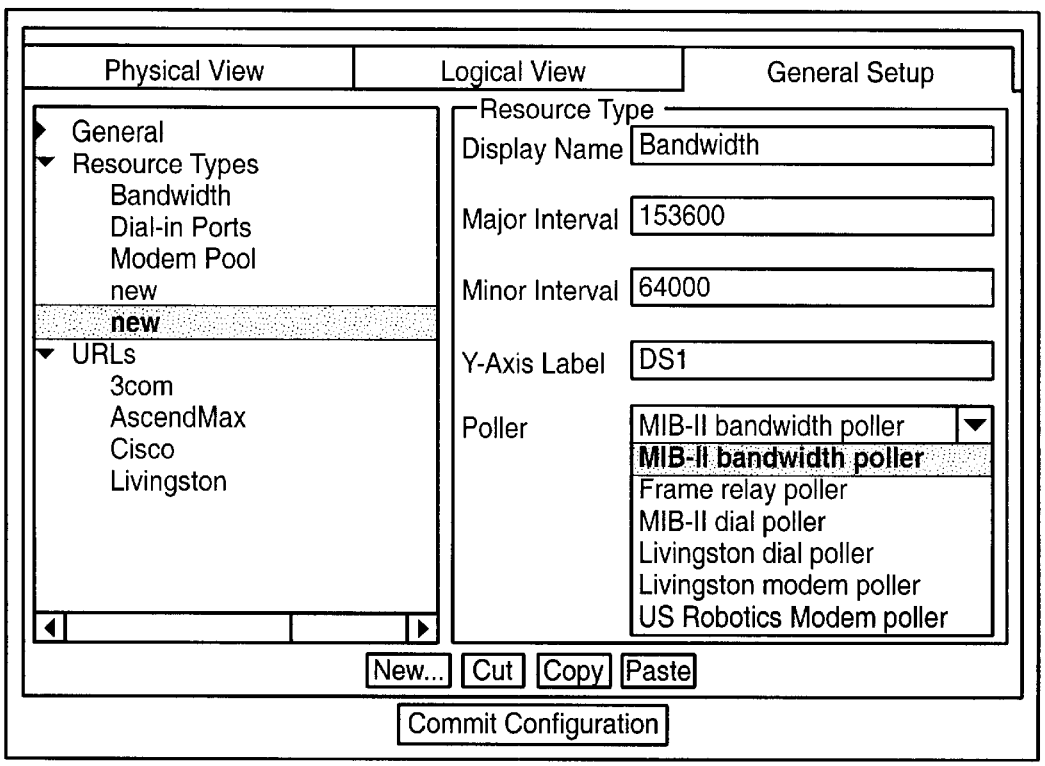
FIG._15

FIG._16

| Physical View | Logical View | General Setup |

General
Resource Types
   Bandwidth
   Dial-in Ports
   Modem Pool
URLs
   3com
   AscendMax
   Cisco
   Livingston Resource Type
- Display Name: Bandwidth
- Major Interval: 1536000
- Minor Interval: 64000
- Y-Axis Label: DS1
- Poller: pmb2band

[New...] [Cut] [Copy] [Paste]

[Commit Configuration]

FIG._17

| Physical View | Logical View | General Setup |

General
Resource Types
   Bandwidth
   Dial-in Ports
   Modem Pool
URLs
   3com
   AscendMax
   Cisco
   Livingston URL
- Link Name: Cisco
- URLs: www.cisco.com/public/Product
- [Test URL]

[New...] [Cut] [Copy] [Paste]

[Commit Configuration]

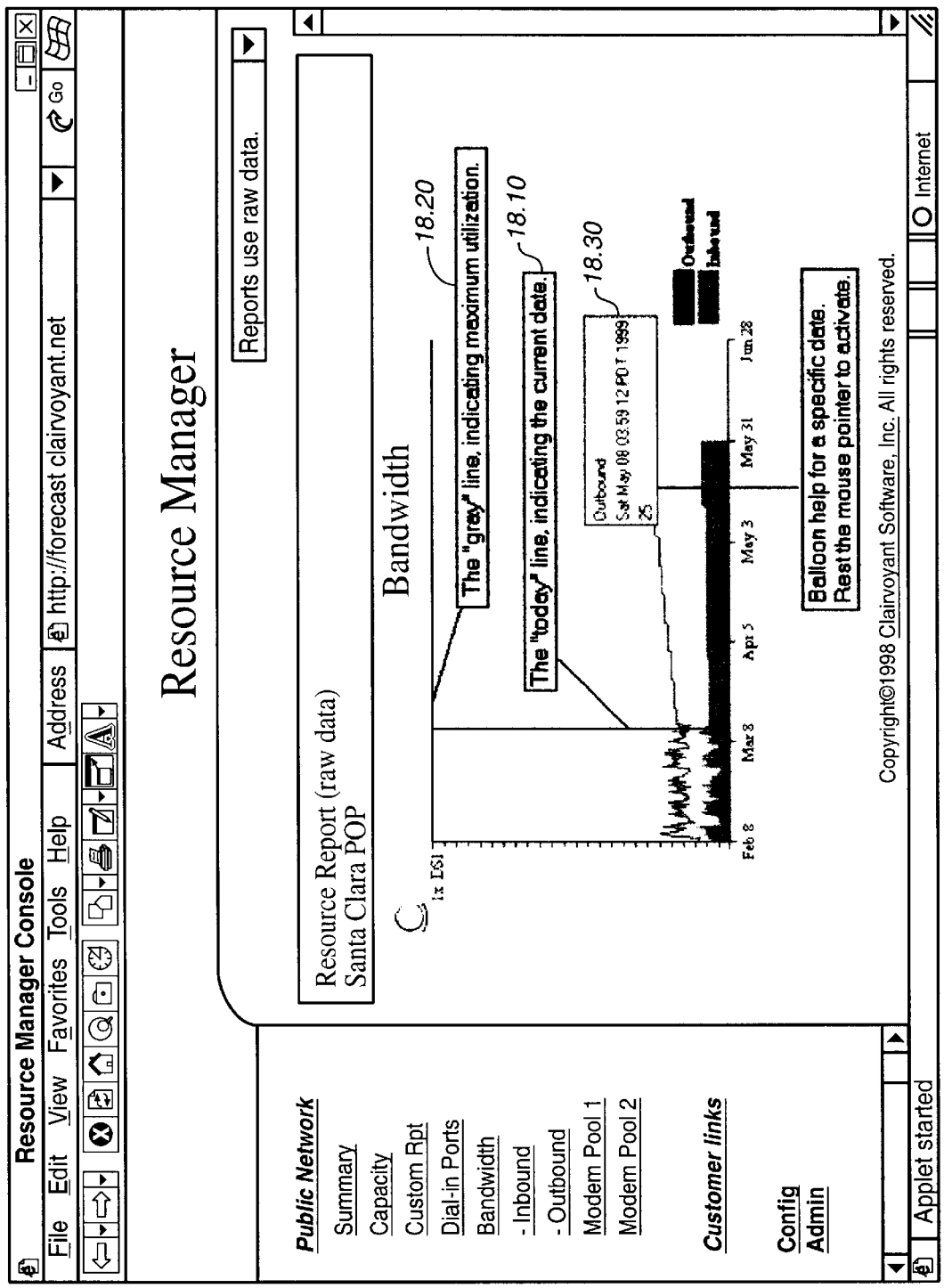
FIG._18

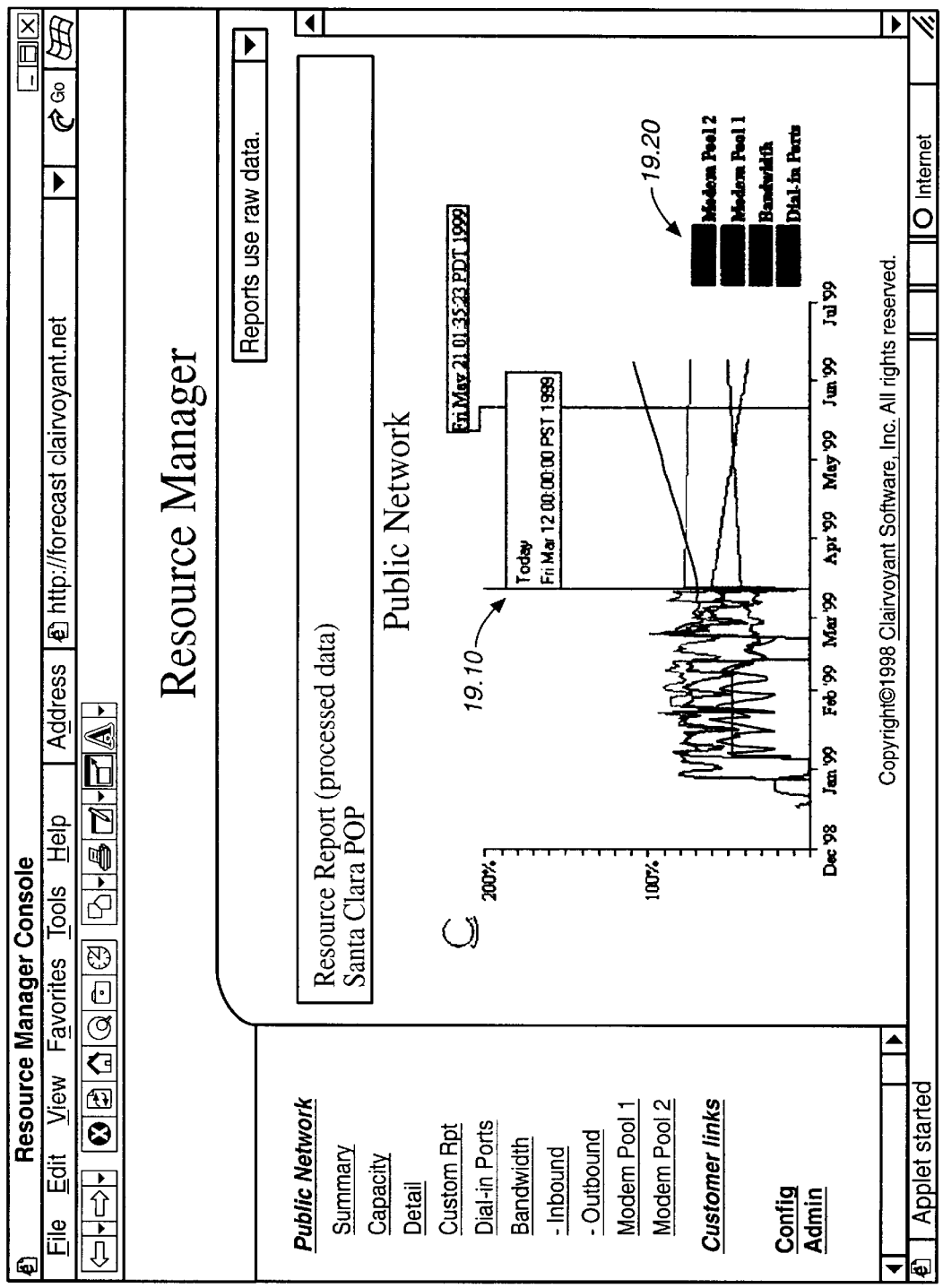
FIG._19

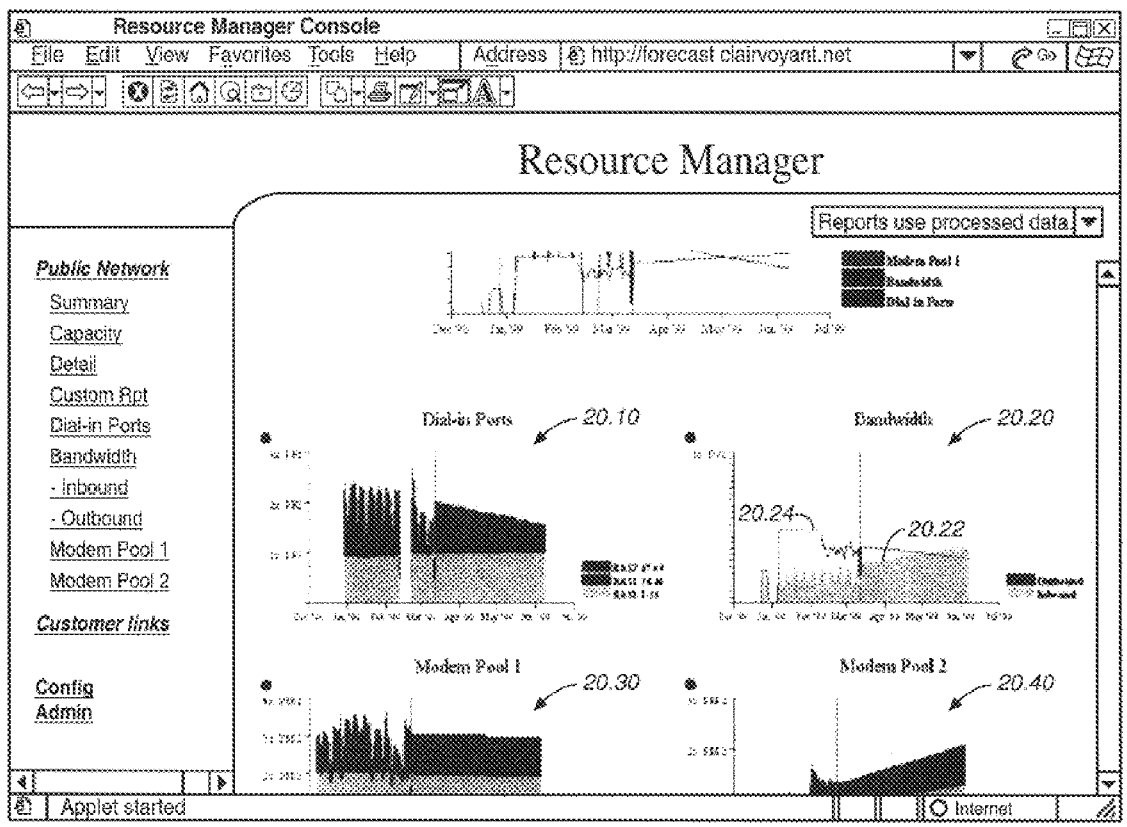
FIG._20

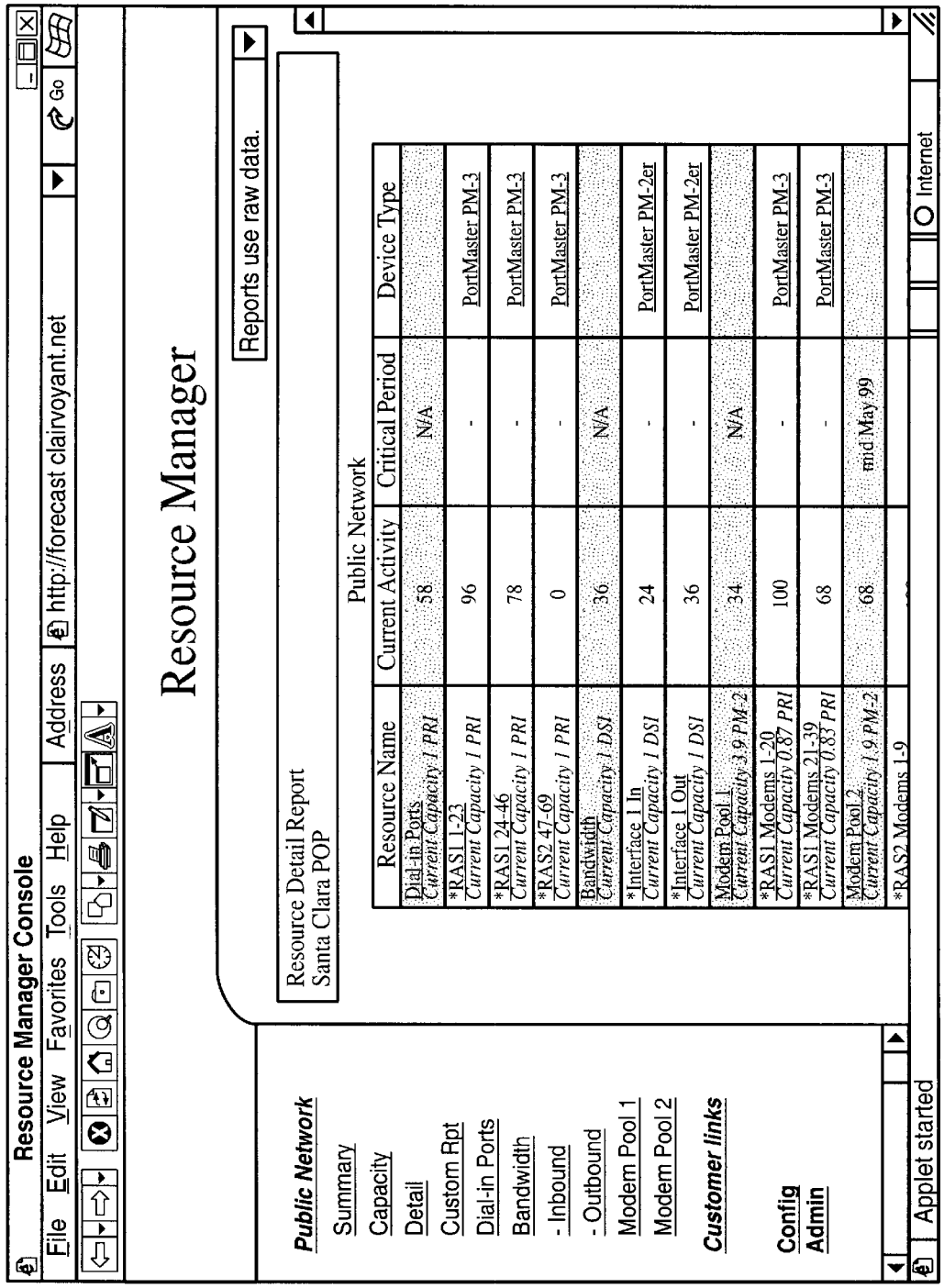
FIG._21

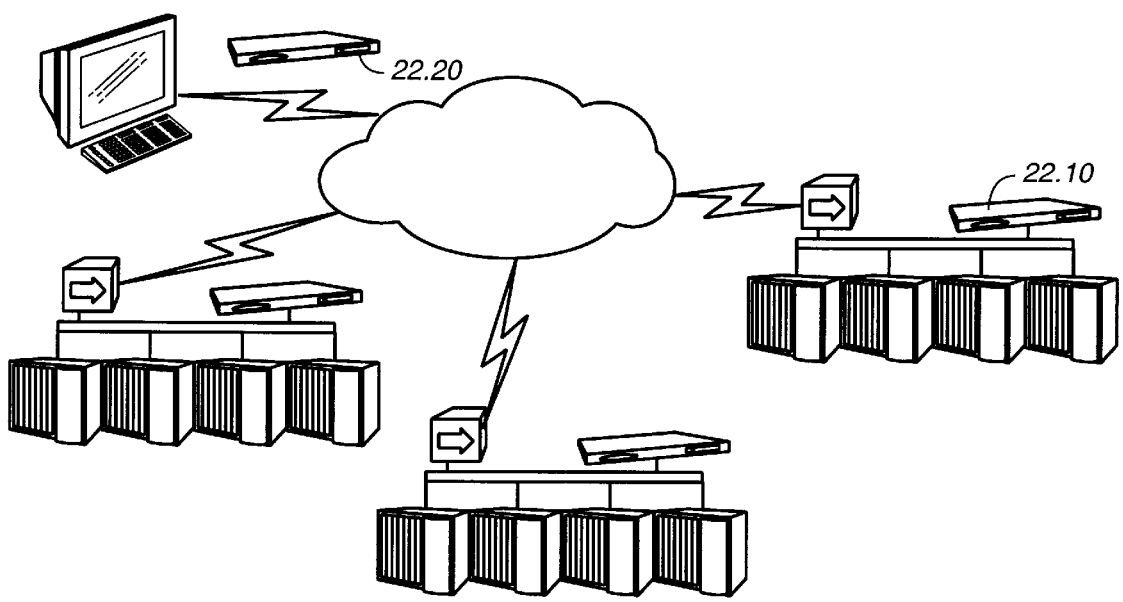
FIG._22

COLLECTING AND PREDICTING CAPACITY INFORMATION FOR COMPOSITE NETWORK RESOURCE FORMED BY COMBINING PORTS OF AN ACCESS SERVER AND/OR LINKS OF WIDE AREAR NETWORK

BACKGROUND OF THE INVENTION

1. Field of the Invention

This invention relates to a method of predicting and displaying resource capacity information relating to computer resources. More specifically, this invention relates to how information is collected from network devices to predict when critical resources will exceed maximum capacity, how it is stored for future use, and how it is displayed for the user.

A portion of the disclosure of this patent document contains material which is subject to copyright protection. The copyright owner has no objection to the facsimile reproduction by anyone of the patent document or the patent disclosure, as it appears in the US Patent and Trademark Office file or records, but otherwise reserves all rights provided under copyright law.

2. Background and Benefits of the Invention

Computer networks have experience explosive growth in terms of size and complexity during the past ten years. Network designers have pushed the envelope of network capacity using innovative architectures. Asynchronous Transfer Mode (ATM), Fiber Distributed Data Interface (FDDI), Frame Relay, Ethernet, and token ring have aided the evolution of network computing resources from simplistic text-based mainframe software to sophisticated client-server imaging software, databases, and business-oriented applications in ever-growing geographical distribution. Both users and vendors have simultaneously demanded and provided networking technologies of greater and greater performance.

As networks grow, the complexity grows, not in proportion to network size, but instead exponentially. This cycle has created a nightmare for network managers who are required to control, manage, and maintain computer networks for their users. At a minimum, these users demand adequate levels of network performance to do their jobs; a solution which is not a simple one.

As a result, network performance management has been a crucial area in which vendors have fielded a variety of tools to monitor, analyze, and model network performance.

Often, these tools are used in a reactive mode to monitor or troubleshoot a current (or recurring) problem. Thus the typical solution is to monitor a network and do one of two things Send an alarm when a threshold exceeds a certain level; or Monitor the network over a long period of time and try to predict when a threshold is exceeded.

Unfortunately, these attempted solutions have not been successful. The inventors have discovered that the reasons are as follows:

1. An element exceeding a threshold for a brief moment is not necessarily a problem. Depending on how acutely you monitor the element, it could exceed a preselected threshold very frequently and still not cause a problem.
2. Solutions that attempt to predict future values have been unsuccessful typically because they base their calculations on historical values of mathematical averages. The average utilization of a network element may be well within acceptable ranges, but the upper operating range of the element during certain time intervals makes the element perform poorly in given circumstances. From the same standpoint, projecting peek utilization is similarly insufficient, as it does not indicate how long peek utilization was maintained.
3. Typically, monitoring networks involves monitoring the devices that make up the networks, or more specifically, specific values maintained on the device, and graphing that value over time. Unfortunately, this rarely yields a view of the network as the user considers it. For example, a user may use three separate 1.5 Mbps WAN lines multiplexed together to connect two sites together. A typical monitoring solution would monitor each WAN line individually, yielding three separate graphs of utilization. In reality, the user considers these three WAN links to be a single 4.5 Mbps resource, not three separate resources. In such a situation the first WAN link may be completely utilized, the second moderately utilized, and the third minimally utilized. Looking at three separate graphs would just cause confusion.

Threshold-based systems have emerged time and time again to overcome a fundamental shortcoming of data used to determine if network performance has deteriorated. Ultimately, these systems try to determine when a resource is completely saturated with activity. Due to the "bursty" nature of data networks, a network can be completely saturated for short periods of time, followed by longer periods of inactivity. If a monitoring system were to sample often enough to actually record such occurrences, it would need terabytes of storage to collect enough samples to demonstrate a longer-term trend. Expanding the sample period to allow a more manageable data set causes averages that mask a potentially serious burst. When longer sample periods are used, the chance that any single sample might reflect 100% utilization decreases, as the resource would have to be used 100% during the entire sample period in order to return a 100% value.

Thresholds are used because 100% samples are highly unlikely with systems that uses long sample periods. In such systems, a 90% threshold may be used with the assumption that in order to return 90% utilization, a certain percentage of the sample must have been higher than the threshold (including the possibility of 100% utilization). These systems may return an alarm when such an event occurs, or the system may even predict when in the future utilization will crest above the selected threshold.

Unfortunately, cresting above such a threshold does not indicate a problem. Users, familiar with such alarms, or even over exposed to such alarms, ignore such alarms or find them meaningless.

Compounding the problem, these systems perform their monitoring on individual elements that may make up a larger resource. For example, if a network maintained three WAN links between two locations, the first WAN link may be 100% utilized, the second 50%, and the third 10%. If a system monitored them individually, there would be a constant alarm on the first WAN link. In fact, as these three links are elements of a larger resource, the entire resource is little more than 50% utilized.

In short, although there are solutions that try to solve this problem, due to difficulties with the granularity of the collected data, and the presentation of that data, the problem has yet to be solved effectively.

In typical network management solutions, polling intervals have often been problematic. If the management system polls resource elements frequently, the system would potentially need terabytes of storage to maintain this information for any meaningful time period. Conversely, if the polling interval is extended, brief event may be masked by longer periods of normal usage. In order to balance these solutions, conventional management systems poll frequently and store this high volume of data for a relatively short period of time. After the data has existed for a preselected period of time, the data is "rolled up", or archived into larger and larger averages as time goes on. In such a system, data may have a fixed polling ranging from seconds to minute intervals available in the database for the first day, but this quickly dissolves into daily averages once the data is several weeks old. This technique presents two problems. First, the quality of data is inconsistent throughout the database, making projections based on this data inaccurate. Second, when trying to determine when usage of the network exceeded a preselected value over a preselected period of time, the information will be unavailable once the data is processed through such a "roll-up" method.

SUMMARY OF THE INVENTION

In summary, therefore, one embodiment of the invention operates by tracking all network resources against their potential capacity and a user preferred operating range. This embodiment of the invention then determines when the critical operating range is going to exceed the current capacity of the resources that constitute the network.

One embodiment of the invention provides that devices are polled in a standard, fixed interval and information is stored only according to when a significant change is observed in that resource element. This, in essence, provides the capability of seeing events that last a potentially short period of time without necessarily requiring the hard drive storage that storing each event would ultimately take. The information about resource elements is stored in the database and analyzes the information over a long period of time. The information can also be displayed by bundling individual resource elements, which are meaningful to the user, to represent their overall resource, if applicable.

Thus, the method of the invention bundles separate homogenous resource elements together as a single composite resource and plots and projects the usage of that resource as a value on a single graph using a single line in one embodiment of the invention.

The invention uses a preselected subset of a daily period to represent the upper operating range of the device. For example, the second standard deviation of a daily period (approximately the worst 36 minutes) can be used to represent the upper operating range of a 24-hour period. Some users may choose to use a $95^{th}$ percentile value, which would be the worst 72 minutes of the day.

Thus, this embodiment of the invention provides for a method that monitors resource elements and bundles them together in a way that is meaningful to the user. The usage is displayed in terms of a current period in graph (x-axis) and usage is projected into the future to determine potential saturation of network resources. A standard logistical regression is used to predict when resources will exceed their known capacity.

Further details of the present invention will become apparent to one skilled in the art from the following detailed description when taken in conjunction with the accompanying drawings

BRIEF DESCRIPTION OF THE DRAWINGS

An exemplary embodiment of the present invention will be described below relative to the following figures.

FIG. 1 is a diagram of how a server communicates with a web browser.

FIG. 2 is a diagram of how multiple servers communicate with a web browser.

FIG. 3 is a schematic representation of the server and display system.

FIG. 4 is a diagram showing how resource elements can be combined to create a resource.

FIG. 5 is a graph showing how storage decisions are made according to an embodiment of the invention.

FIG. 6 is a flowchart showing how storage decisions are made.

FIG. 7 is a table representing how data is stored in the system.

FIG. 8 is a graph representing how resources consisting of multiple elements are displayed.

FIG. 9 is a graph illustrating how time-to-saturation period is determined.

FIG. 10 is a picture of a web browser screen used to configuring the system.

FIG. 11 is a picture of a web browser screen which introduces users to the system.

FIG. 12 is picture of a screen accessed through a web browser for adding new networks to the monitoring system and configuring current networks.

FIG. 13 is picture of a screen accessed through a web browser for adding new resources to the monitoring system and configuring current resources.

FIG. 14 is a picture of a screen accessed through a web browser for placing one resource into another.

FIG. 15 is a picture of a screen accessed through a web browser for adjusting general server settings.

FIG. 16 is a picture of a screen accessed through a web browser for adjusting how data about resources is displayed to users and how data is collected.

FIG. 17 is a picture of a screen accessed through a web browser and display web addresses associated with a device.

FIG. 18 is a picture of a Summary Report screen accessed through a web browser.

FIG. 19 is a picture of a Detail Report screen accessed through a web browser.

FIG. 20 is a picture of a Detail Report screen accessed through a web browser.

FIG. 21 is a diagram of a Detail Report showing Critical Period Projects through a web browser.

FIG. 22 is a diagram illustrating master-to-slave communication between multiple Resource Servers.

DETAILED DESCRIPTION OF THE PREFERRED EMBODIMENT

I. Server System Storing Software and Collected Data

FIG. 1 represents a system for displaying and predicting network capacity information in which information is collected from resources at a Point of Presence (POP) 1.10 to determine when key resources will reach saturation. A server 1.20 located at the POP 1.10 collects information from resources 1.30 and sends that information to a web-based browser 1.40 for display.

FIG. 2 shows a system for displaying and predicting network capacity information which consists of multiple POP's 1.10 distributed throughout a network. Information is collected regarding POP 2.10, 2.20 and 2.30 through slave servers 2.40, 2.50 and 2.60 located at the respective POP's. Through HTTP based communications, these slave servers communicate with and relay information to a master server 2.70 for display on the terminal 2.80.

FIG. 3 is a schematic representation of the major components of the server and display according to an embodiment of the invention. In this figure, two separate resources 3.10 and 3.20 are shown. Resource 3.10 is a compound resource that comprises two individual and separate resource elements 3.11 and 3.12. Resource 3.20 is a resource that is comprised of a single resource element 3.21. In this example, each resource element 3.11, 3.12 and 3.21 is a discrete component of an overall resource. A resource is one or more homogenous resource elements that ultimately serves a single purpose or function. For example, a resource may be a data connection on a communications network that connects one point on the network to another. That connection may be comprised of a single connection, or be shared across multiple connections, with each connection being a resource element.

Some examples of network resources include, but are not limited to: WAN bandwidth (T1/T3 Lines, OC-X lines, xDSL lines, and etc . . . ), routers (number of units and ports, amount of memory, etc.), remote access servers (number of ports), E-Commerce and web hosting servers (CPU utilization, amount of memory, etc.), shelving units, power requirements and cooling within the POP or network "closet".

In the system of one embodiment of the invention, Software in the system allows for multiple elements grouped into a single resource or a single element into multiple resources for the purpose of monitoring network capacity and usage. This is typically done by Software.

A collector 3.30 is responsible for acquiring data pertaining to usage of each resource element 3.11, 3.12 and 3.21. The collector 3.30 collects information from each resource element on a preselected fixed interval. Each collector analyzes the collected data to determine if there has been a significant change since the last stored value for the specific resource element. As is described below, this data would have previously been stored in a database 3.40. If the collected value does not differ from the stored value more than a preselected amount, that value is discarded and the collector collects a new sample at the next collection interval. However, if the collected value has indeed changed from the stored value greater than the preselected amount, the value and a timestamp are stored together in the system, and this new value becomes the comparison value for future collected data.

For example, bandwidth of a resource element may be monitored every 30 seconds (polling the device to determine the utilization every 30 seconds), but the information is not necessarily stored in a database unless a significant change occurs in comparison to previously saved data.

When a resource element is monitored in the middle of the night, for example, the element may not vary in utilization and, as a result, during the course of a 4-hour period, there may be only one or two intervals stored off in the database. However, if suddenly a burst of activity does occur, and utilization jumps to a high percent and that burst only lasts for 30 seconds, that event will be recorded in the database.

Database 3.40 is the area where historical values are stored for long-term analysis. In this illustrated embodiment, each resource element maintains its own area within the storage subsystem. Each record contains a value and timestamp pair. When analyzing the information maintained within the storage system, each record represents a significant change in activity or usage. In this system, this activity or usage level is in until the timeframe represented by the timestamp maintained within the next record in the system.

Resource engine 3.50 of the system contains logical components detailing the relationship between the discrete resource elements, and functionally combines resource elements into their composite resources for purposes of display and analysis.

Presentation element 3.60 displays network resource capacity information. The presentation takes data relating to the individual resource elements 3.11, 3.12 and 3.21, stored in the system represented by database 3.40, and combined by the resource engine 3.50, and displays them in a way that is understandable and useful to the user of the system. The entire architecture is designed to provide information to the user via the user's Internet browser using "Server Side Include" (Java or CGI based) web-based templates, but other methods of display may be used.

For example, if a user has 2 or 3 WAN links connecting one site to another, each WAN link would be monitor individually, but upon display the system would combine these resource elements into a composite resource. The three Ti (1.544 Mbps) links would be combined into a single graph, with the top of the graph representing the combined total available bandwidth (4.5 Mbps), and the three separate utilization values presented in a stacked area graph, with the top of the plot representing how much of the composite resource is used. This allows the user to see the usage of the entire resource. Similarly, if a user wished to view dialup ports, all dialup ports within a "hunt-group" should be displayed as a single resource, even if these resources are maintained on different ports and different physical devices.

Displaying this information over a long term represents difficulty as well. If the graph were to represent a years worth of data, the resolution of the graph would be a limiting factor. A yearly graph may only maintain enough granularity to present only a single point of data for each day. If the graph were to display the average value for each day, this number may be misleading, as a daily average would average eight hours of activity versus sixteen hours of inactivity. If the graph were to represent the maximum value for the day, that value may be equally misleading, as that value could easily be 100%.

1. Resource Elements and Composite Resources

FIG. 4 illustrates how resource elements can be combined into certain resources. FIG. 4 represents how several resources within a single small portion of a communications network can be available. In this example, four separate resources are represented, comprising eight separate resource elements 4.10, 4.12, 4.14, 4.20, 4.32, 4.34, 4.36, 4.40.

Resource element 4.10 shows a selection of ports on a remote access server. The central and right-most boxes 4.12 and 4.14 containing shaded and unshaded spots also represent remote access servers. Each shaded spot represents active (used) dialin ports and the unshaded spots represent inactive (unused) dialin ports. In this example, a fair number of ports in the leftmost remote access server 4.10 and the center access server 4.12 are used and there is a group of ports on the rightmost dialin access server 4.14 that are also designated as part of composite resource 4.08. Despite the fact that they are homogenous resource elements across multiple devices, they are gathered up into a single composite resource.

Resource 4.20 consists of 12 of the 32 dialin ports in the right-most remote access server. Resource 4.10 shows a separate resource which is a subset of the ports on the right-most remote access server. In this case four of the reserved twelve ports are active. This shows how a single device may be subdivided into multiple resources. In this circumstance, a resource may span devices or may be a subset of a single device.

WAN links 4.30 show how several discrete resource elements 4.32, 4.34 and 4.36 can be combined into a single compound resource. WAN links 4.30 consists of three separate WAN links which are connecting two separate sites, and the user balances the traffic load, or multiplexes the data across all three connections.

WAN 4.40 shows another resource, which is a single WAN link. This illustrates how a resource may be a combination of elements (in this example homogeneous elements) or a just a single element unto itself 2. Collector Usage data is collected from network elements via the Simple Network Management Protocol (SNMP). A Management Information Base (MIB) polling mechanism is used to collect and store statistical data from network elements. Network elements are polled every 30 seconds by server software, which implements the polling/collecting process according to an embodiment of the invention.

3. Storing Usage Data

FIG. 5 illustrates how usage data for resources is stored in database 3.40 (of FIG. 3) via the Analog Granularity Engine (AGE) process. The Analog Granularity Engine is an excellent example of statistical monitoring and economical data storage. It allows for storage of long term, highly granular information that requires a minimal amount of data storage while providing extremely high performance.

FIG. 5 is a graph displaying usage over time for a hypothetical network component, in which time is represented on the horizontal axis and usage on the vertical axis. In this example, utilization hovers at a certain amount until there is sudden increase in utilization, indicated at vertical line 5.10. At this point, the data collector reference 3.30 would determine that a delta change event-of a significant nature had occurred such that the information should be saved to the database. The system saves the new utilization value and the timestamp, of when that change, occurred in the storage system.

Referring back to the graph of FIG. 5, it can be seen that activity continues at this new, heightened level for sometime, then reduces rapidly until the time indicated at vertical line 5.20 is reached. At this point, the system determines that the change between the high activity versus the new lower activity is significant enough to warrant storing this new value in the storage system. Once again, the new value and timestamp pair is stored in the storage system.

Activity continues at this level until the time indicated vertical line 5.30 is reached, at which point utilization once again has changed significantly enough to trigger a storage event. However, usage stays at this high level for only a short period of time, and another storage event is triggered at the next collection interval 5.40.

As FIG. 5 illustrates, this AGE process allows for the storage of an accurate history of network elements and resources without the need for conventional "averaging", which sacrifices fine granularity of data collection. The process also requires less hard-drive storage capacity. The use of the AGE allows polling of each element at frequent intervals (say, every 30 seconds), but requires much less than storage than other network management systems.

FIG. 6 represents the simple flowchart of how a storage decision is made by the variable granularity system for a resource element.

Element 6.10 represents the collection event. In this section, data is collected from the resource element to determine current activity or usage.

Element 6.20 represents the actual decision process. At the stage represented by element 6.20, the collected value is compared with the previously stored value. If the absolute value of the difference between the collected value and the stored value is greater than a selected value, the decision will be to trigger a storage event. In this circumstance, the value is passed to the process represented by element 6.30. If the absolute value of the difference between the collected value and the stored value is not greater than or equal to the selected value, the collected value is discarded and the collection process represented by element 6.10 is repeated at the next collection period.

If the storage process represented by element 6.30 is invoked by the process represented by element 6.20, the storage process will save the collected value in combination with the timestamp associated with the value, and the collected value will become the comparison value against which future collected values are compared.

FIG. 7 represents the data stored in the database. Fundamentally, the database contains a timestamp and an associated numerical value pair that represents the utilization of a particular resource element. The combination of timestamp and the numerical value are important, as the timestamp indicates when a particular activity level began, and the value presents the level of activity determined. The first record 7.10 in the table reflects a value of 21, with a timestamp of zero for that daily period. The second record 7.20 reflects a value of 16, with a timestamp of 3:36. With this information, we can determine that the value of approximately 21 continued for at least three minutes and thirty-six seconds before the value dropped significantly enough to warrant a storage event. The following record 7.30 indicates a timestamp of 7:12 with a value of 9. In this case, the value was approximately 16 for another three minutes, thirty-six seconds.

4. Generation of Daily Data

FIG. 8 shows usage data for a single resource consisting of two resource elements. It illustrates how data for resources consisting of multiple elements can represented graphically and how daily data for a resource is represented.

In FIG. 8, two separate resource elements RAS1 and RAS2 comprise a composite resource. The usage for resource element RAS1 for any given day is represented by the vertical height of the lightly-shaded (lower) area for that day. The usage for RAS2 for any given day is superimposed upon the usage for RAS1 and is represented by the darkly-shaded area. The total usage for the composite resource for any given day is the sum of the usage for RAS1 and RAS2 taken parallel to the vertical axis of the graph. For example, if FIG. 8 represented the number of used ports across two remote access servers, the usage level indicated by 8.10 would represent usage on January 22 for RAS1, the usage level indicated by 8.20 would represent usage on that day for the composite resource including RAS1 and RAS2, and usage for RAS2 on that day would equal the difference between the values indicated by 8.20 and 8.10. Although FIG. 8 is a stacked area graph, any stacked graph could accurately represent the combined utilization of the composite resource.

As previously discussed, usage levels indicated by 8.10 and 8.20 are representative of usage levels for the day January 22. More specifically, those levels indicate the lowest percentage of capacity utilization during "peak minutes" of capacity usage on January 22. The quantity of "peak minutes" that are considered for the purposes of calculating the data point indicated by 8.20 is selectable by the user. For instance, the usage level indicated by 8.20 could indicate the minimum capacity usage during highest 36 minute periods of usage on January 22. If the lowest percentage of usage during this period were 80 percent, then 80 percent would be used to represent usage for the composite resource on January 22 and would be used by the server to predict when capacity may be exceeded. The data point indicated by 8.20 would represent this 80 percent value in FIG. 8. Servers at each POP of a network contain logical components which can generate daily capacity usage data for composite resources, as FIG. 8 indicates.

5. Comparing Resources with Capacity Limits and Predicting when Capacity will be Exceeded Logical components within the server review data provided by database 3.40 and compare the current status of any given resource against its capacity limits. An algorithm is then applied to the data to predict when the upper operating range of any given resource will exceed its capacity.

FIG. 9 represents how a time-to-saturation period is graphically represented. In this illustration, the X axis of the graph represents utilization, and the Y axis of the graph represents time passed.

A vertical line 9.10 representing the current time is apparent. All plotted data values 9.20 to the left of this line, are historical and recorded values. All values 9.30 to the right of this line are calculated or projected values based on the historical data.

A standard linear regression technique is used to generate projections of capacity usage. However, this system is not limited to linear regression techniques and may include logistical regression techniques to more accurately plot exponential growth, if historical samples warrant.

II. Configuring Networks and Resources

Data, statistics and predictions regarding capacity usage of network elements and resources may be viewed by a user with any supported Java-based web browser that has access and privilege to access servers such as those depicted in FIGS. 1 and 2, according to an embodiment of the invention. However, before the system can be used to monitor network elements and resources it must be configured so that it can monitor elements and resources the user desires.

Configuring is performed through the configuration applet. This configurator is available through the Config option in the menu frame and is shown in FIG. 10.

1. Physical View

The Physical View tab 11.10 shown in FIG. 11 provides a means to describe the devices on a network that are to be monitored. Each device that you wish to monitor must have an entry on the Physical View list 11.12. The Physical View list records which devices are polled and how polling information is stored.

2. Adding and Configuring Devices

Adding a device provides general information to the server network about individual devices and how those devices can be communicated with so that information about device interfaces can be collected.

For, example, to add a new device, select the New . . . button. Next, from the dialog box that appears, select whether you wish to add either a Device or Element. A Device is a complete physical device, such as a router. An Element is a discrete part or interface on a device. For example, an Element could be a dialup port of a specific device. The Properties page will appear to the right of the device tree. The Properties page allows addition of a new device's name and description to the system, addition of its IP address, control of the URL associated with the device, and control of the SNMP Community string associated with the device. An SNMP Community string is a password associated with a particular device in a network that must be used to obtain information from the device, such as information regarding usage.

Finally there is a AutoConfigure button 11.40 that allows rapid configuration of interfaces. This option will display a list of all available interfaces on the specified device. Select the interfaces you wish to monitor and press the OK button. This process will automatically configure the interfaces of this device. Once invoked, the AutoConfigure process may take some time to complete: no status bar is displayed during AutoConfigure. AutoConfigure affects only the device's polling characteristics. The server network does not change the configuration of devices.

3. The Logical View

The hierarchy described within the Logical View tab 11/20 will correlate directly to the hierarchy presented in the server network's main menu. Organizing resources and element in the Logical View optimizes the usefulness of the presented data.

The highest level of the hierarchy is the network. This is a logical grouping of possible dissimilar resources into sets according to responsibility. For example, within one POP environment, there are resources for which the Internet Service Provider (ISP) is directly responsible in maintaining adequate capacity (dialup lines, bandwidth etc), and there are resources that fall under the responsibility of the ISP's customers (customer leased lines, etc). In this circumstance, the ISP may want to organize all of the resources for which they are responsible into a network call "Public Network", and the remaining customer leased lines into another network called "Customer Leased Lines". The ISP may want to break customer leased lines into even smaller networks, assigning each customer their own network in the hierarchy. Users can group resources to suit their needs, and resources can contain elements or they can contain sets of other resources.

4. Adding and Configuring Networks or Resources

Adding a new network or resource, involves actuating the New . . . button from the Logical View tab in the configurator, according to an embodiment of the invention. A dialog box will then appear, as shown in, allowing the addition of a Network or Resource. The user can then select a Network or Resource radio button depending on which kind of component is to be added to the network. If the Network button is selected, FIG. 12 will appear, and if the Resource button is selected, FIG. 13 will appear.

Several items can be configured for a resource, including name and resource type, which refers to the category or a resource (bandwidth, for instance). A resource can be populated either with resource elements or with other resources. If you chose to use the default resource elements, you can use the two columns of resource elements to select which elements to associate with this resource, as showing in FIG. 13. The "Available" column displays resource elements that have not been associated with resources. The "Current" column shows the resource elements that have already been associated with the specific element being displayed. A resource element must be associated with a resource in order to be displayed on a report.

5. Resource and Sub-Resources

There are circumstances in which a user may want to organize resources into sub-resources by placing one resource into another. FIG. 14 illustrates how this is done.

For example, if a user were multiplexing several WAN segments together, he or she may want to combine all of the inbound bandwidth elements into one resource, all of the outbound bandwidth resources into another resource and both of those resources into an overall bandwidth resource.

6. General Setup

The General Setup tab 11.30 shown in FIGS. 11 and 15 contains configuration options that probably would not be altered by an average user on a regular basis. The options under this tab allow for the configuration of the name given to monitored POP, the directory on which database files are stored, Template root, Community, and Critical Value, the number of minutes of peak usage examined in order to generated daily data points for a resource of element.

7. Resource Types

Resource types describe how resources are displayed and how data is collected from resource elements. As shown in FIGS. 15 and 16, the General Setup tab allows the name of a resource to be changed in the system and how axes are labeled on graphs of capacity utilization.

8. Links

Links are simply hyperlinks that are associated with device types. In Detail reports, references to device types are hyperlinked to a selected URL (Universal Resource Locator). FIG. 17 shows a URL and a Link Name for the URL, both of which are associated with certain resource types displayed.

III. Display of Capacity Information

The server system's user interface allows you to easily generate reports on past and future network behavior. Understanding how these reports are generated is key to realizing the full benefits of server system.

1. Processed vs. Raw Data

Reports are generated from data stored in a database. Data can be stored either in raw or processed form.

Raw data is discrete data representing a value change in network utilization. If you have very active or fluctuating network traffic, a maximum of 400 raw data points can be stored in the database for each network resource per day. Each data point uses one byte of storage space.

Processed data is data that has been statistically reduced to represent the most significant activity for a given time period. Typically, this time period is a day. While the time period, or interval, can be changed, processed data within the server system defaults to the most-active 36 minutes of each day.

2. The Standard Reports

The Standard Reports are designed to provide high-level information on the resources monitored by server system. The Standard Reports display either the last nine months of data or the beginning of the data files depending of the volume of data available, followed by a projection of the trend of the following three months.

To derive maximum benefit from the Standard Reports, it is important to understand some standard user interaction (mouse clicking and highlighting) within the reports. A typical Standard Report is shown in FIG. 18.

The labels in FIG. 18 indicate two primary lines within the report. The "today" line 18.10 indicates the current day. Activity that occurred prior to the "today" line is shown to its left. Future activity is projected to the right. The line 18.20 at the top of the graph indicates maximum possible bandwidth. In this example, The server system indicates when future network resource activity will exceed maximum possible bandwidth.

A balloon help box 18.30 displays information about the resource over which the mouse pointer is "rested", according to an embodiment of the invention. In the example above, the mouse pointer was placed over May 8 and allowed to rest or hover. In addition to the date and time, the percent of utilization of that network resource is also displayed.

3. The Summary Reports

The Summary Report in FIG. 19 shows overall network resource activity, with individual resources represented by individual lines. This report shows all high-level resources. The graphs displayed to the left of the "today" line 19.10 give an indication of past daily activity of network resources. As the legend 19.20 indicates, each graph represents daily usage for a resource. The graphs right of the "today" line 19.10 predict percentage utilization for network resources in the future. A user can also infer from this graph possible constraints on network usage.

As shown in FIG. 19, the server system indicates through a box when the resource "Modem Pool 2" is projected to exceed the maximum when the user clicks his or her mouse button over the intersection of the horizontal 100% capacity usage line and the Modem Pool 2 regression graph.

4. Detail Reports

In FIG. 20, each resource represented by a line in the Summary Report in FIG. 19 is displayed separately in its own sub-graph 20.10, 20.20, 20.30, 20.40. Each sub-graph shows separate graphs for resources that are subcomponents of the composite resource being graphed. Values represented in each detailed graph may be displayed differently from their representation in the Summary Report.

For example, the Bandwidth detail sub-graph 20.20 is shown as separate graphs of Inbound and Outbound activity, 20.22 and 20.24, respectively. To accurately display this in the Summary Report, the greater value between Inbound and Outbound is shown, rather than an average (or some other characteristic) of activity, according to an embodiment of the invention. It is important to represent the maximum traffic, regardless of destination, as a factor in the capacity of a resource.

For Dial-in Ports and Modem Pools, the values shown in the Summary Report are derived as summations of total activity. For example, dialin ports may be represented by a "hunt group" that spans three separate remote access server devices. In this example, the total number of dialin ports would be equal to the sum of the dialin ports maintained on each remote access server. Utilization would be determined by comparing the sum of used ports on each remote access server in comparison to the total number of ports for each remote access server. The Detail Report displays compound resources as composed of individual resources. Both compound resources and individual resources are shown by name.

For each resource, its current activity is shown as a percentage. For compound resources, the current activity is a percentage, according to an embodiment of the invention of the total capacity of all the individual resources. For individual resources, the current activity is a percentage of that individual resource's maximum value. For example, if a particular resource is comprised of three DS0 lines having activity levels of 100%, 50%, and 0% respectively, the compound resource's activity would be 50% —the total effective bandwidth of the three DS0s that comprise the compound resource.

5. Detail Report Showing Critical Period Projection

The Critical Period column shown in FIG. 21 displays a projection of when capacity will be exceeded for compound resources. If the resource is expected to exceed maximum capacity a quarterly calendar period of when the capacity will be exceeded is calculated and displayed, according to an embodiment of the invention. If the resource may exceed that capacity before the nearest quarterly period begins, a semi-monthly period will be calculated and displayed, according to an embodiment of the invention.

6. Custom Reports

Selecting the Custom Reports on the main menu in FIG. 10 presents the processed data reports form. Custom Reports are available when the Standard Reports of FIG. 18 do not display either the specific data or time frame which you desire. The form requests the resource, start time and stop time to be shown on the report. The default values present the last month of data. Projections greater than 3 months are possible using this method, however the accuracy of such reports decreases as the time interval increases. The granularity of a processed data report is a single day—data is graphed in increments of one day.

Raw Data Reports are similar to Processed Data Reports, with the exception that Raw Data Reports can graph data in increments less than a day. By default, the server system polls devices every 30 seconds. Provided that there is enough data in the database, and the resolution of the graph permits, Raw Data Reports can produce graphs that take full advantage of the granularity of the database.

IV. Master-to-Slave Communication Between Multiple Resource Servers

HTTP (Hyper Text Transfer Protocol) based communications allows a Master Resource Server 22.20 shown in FIG. 22 to receive daily statistical updates from other servers 22.10 in a network, according to an embodiment of the invention. Communications overhead is minimal and are scalable as one master can easily control over 1,000 slave servers. This capability allows disparate POPs and their component resources to be monitored by a central Master Resource Server 22.20 so that capacity utilization among POPs can be compared and predicted. Daily usage values are sent from each slave server to the master server so that summary data for a network can be accessed through the single master server.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of collecting network information, comprising:

combining a set of network resources to create a composite resource corresponding to said set of network resources;

collecting network traffic utilization data for said composite resource;

identifying when said network traffic utilization data is outside a band of values associated with a recent network traffic utilization value, thereby indicating a significant change in network traffic at said composite resource; and storing said network traffic utilization data in response to said identifying;

wherein combining said set of network resources to create said composite resource includes combining ports of an access server and/or combining Wide Area Network links.

2. The method of claim 1 wherein collecting includes collecting network traffic utilization data at predetermined time intervals.

3. The method of claim 1 wherein storing includes assigning said network traffic utilization data as said recent network traffic utilization value.

4. The method of claim 1 wherein storing includes storing said network traffic utilization data with a time stamp.

5. The method of claim 4 further comprising analyzing stored utilization data time stamps and associated network traffic utilization data to predict network resource saturation.

6. The method of claim 5 further comprising displaying a time-to-saturation graph.

* * * * *